(12) United States Patent
Belzile et al.

(10) Patent No.: US 8,936,457 B2
(45) Date of Patent: Jan. 20, 2015

(54) MOLD ASSEMBLY WITH INTEGRATED MELTING DEVICE

(75) Inventors: Manon Danielle Belzile, Fairfield, VT (US); Daniel Hontheim, Bettingen (DE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 87 days.

(21) Appl. No.: 13/639,685

(22) PCT Filed: Mar. 26, 2011

(86) PCT No.: PCT/US2011/030102
§ 371 (c)(1),
(2), (4) Date: Oct. 15, 2012

(87) PCT Pub. No.: WO2011/126780
PCT Pub. Date: Oct. 13, 2011

(65) Prior Publication Data
US 2014/0023744 A1  Jan. 23, 2014

Related U.S. Application Data

(60) Provisional application No. 61/321,927, filed on Apr. 8, 2010.

(51) Int. Cl.
*B29C 45/16*     (2006.01)
*B29C 45/72*     (2006.01)
*B29C 45/02*     (2006.01)
*B29C 45/27*     (2006.01)
*B29C 45/54*     (2006.01)
*B29C 47/54*     (2006.01)
*B29C 47/60*     (2006.01)

(52) U.S. Cl.
CPC ................ *B29C 45/72* (2013.01); *B29C 45/02* (2013.01); *B29C 45/27* (2013.01); *B29C 45/54* (2013.01); *B29C 47/54* (2013.01); *B29C 47/6018* (2013.01); *B29C 2045/1685* (2013.01)
USPC .......................................... 425/130; 425/557

(58) Field of Classification Search
USPC ........................................ 425/557, 562, 130
See application file for complete search history.

(56) References Cited

U.S. PATENT DOCUMENTS

| 2,615,206 A | 10/1952 | Lindstedt et al. |
| 3,647,338 A | 3/1972 | Ise |
| 4,290,701 A | 9/1981 | Schad |
| 4,634,366 A | 1/1987 | Brun et al. |

(Continued)

FOREIGN PATENT DOCUMENTS

| EP | 0907484 A | 4/1999 |
| EP | 1745910 A1 | 1/2007 |

(Continued)

OTHER PUBLICATIONS

International Search Report, 4 pages.

*Primary Examiner* — Tim Heitbrink

(57) ABSTRACT

A platen-supported system (105) for use with a molding-system platen structure (107), the platen-supported system (105) comprising: a frame assembly (103) connectable with the molding-system platen structure (107); and at least one plasticating device (201) supported by the frame assembly (103). A molding system (100) having a mold frame assembly (203) configured for supporting a molding assembly (200), and the at least one plasticating device (201) located within the mold assembly (200).

12 Claims, 11 Drawing Sheets

(56) References Cited

U.S. PATENT DOCUMENTS

| | | |
|---|---|---|
| 5,123,833 A | 6/1992 | Parker |
| 5,439,633 A * | 8/1995 | Durina et al. ............... 425/562 |
| 6,152,721 A * | 11/2000 | Schad et al. ............... 425/557 |
| 6,267,580 B1 | 7/2001 | Leopold et al. |
| 6,322,343 B1 | 11/2001 | Yoda et al. |
| 6,419,869 B1 | 7/2002 | Gotterbauer et al. |
| 6,468,458 B1 * | 10/2002 | Anderson et al. ............ 425/576 |
| 7,090,481 B2 | 8/2006 | Seta et al. |
| 2002/0155187 A1 | 10/2002 | Kang |
| 2004/0051195 A1 | 3/2004 | Okamura et al. |
| 2006/0099299 A1 | 5/2006 | Wang |
| 2008/0199554 A1 | 8/2008 | Manda et al. |
| 2008/0251974 A1 | 10/2008 | Simone |
| 2009/0274790 A1 | 11/2009 | Jenko et al. |

FOREIGN PATENT DOCUMENTS

| | | |
|---|---|---|
| JP | H02178012 A | 7/1990 |
| JP | 2000238094 A | 9/2000 |
| JP | 2001018258 A | 1/2001 |
| JP | 2003053770 A | 2/2003 |
| JP | 2007537880 A | 12/2007 |
| JP | 2008300413 A | 12/2008 |
| WO | 9702126 | 1/1997 |
| WO | 2009015784 A1 | 2/2009 |

* cited by examiner

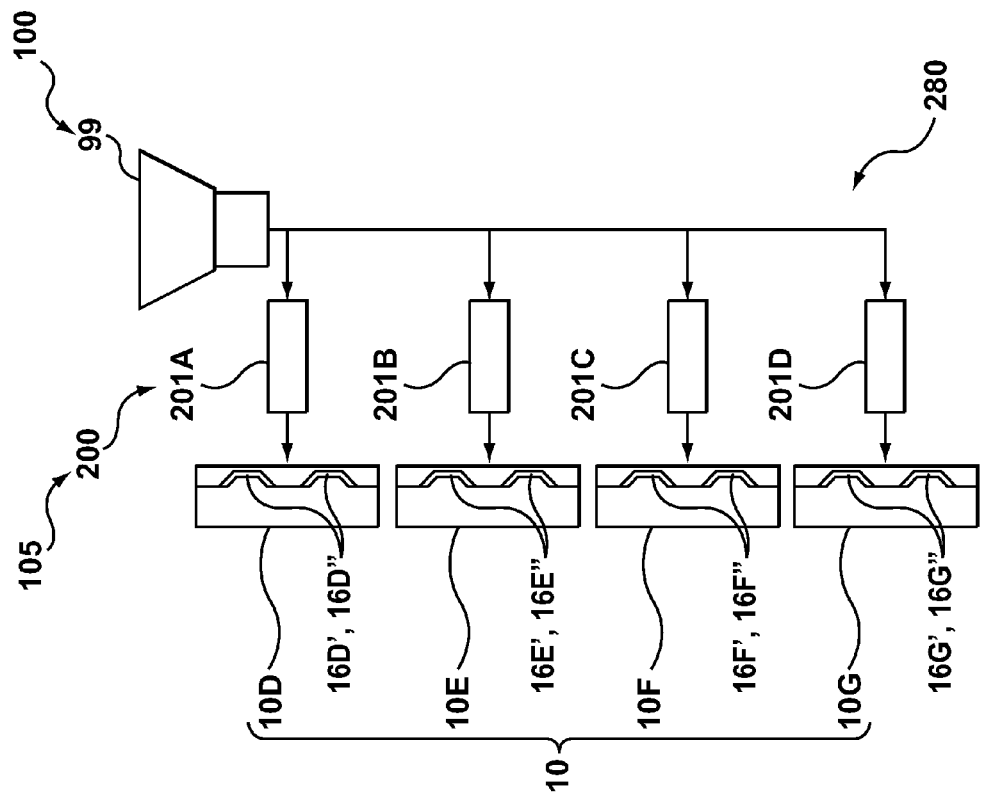
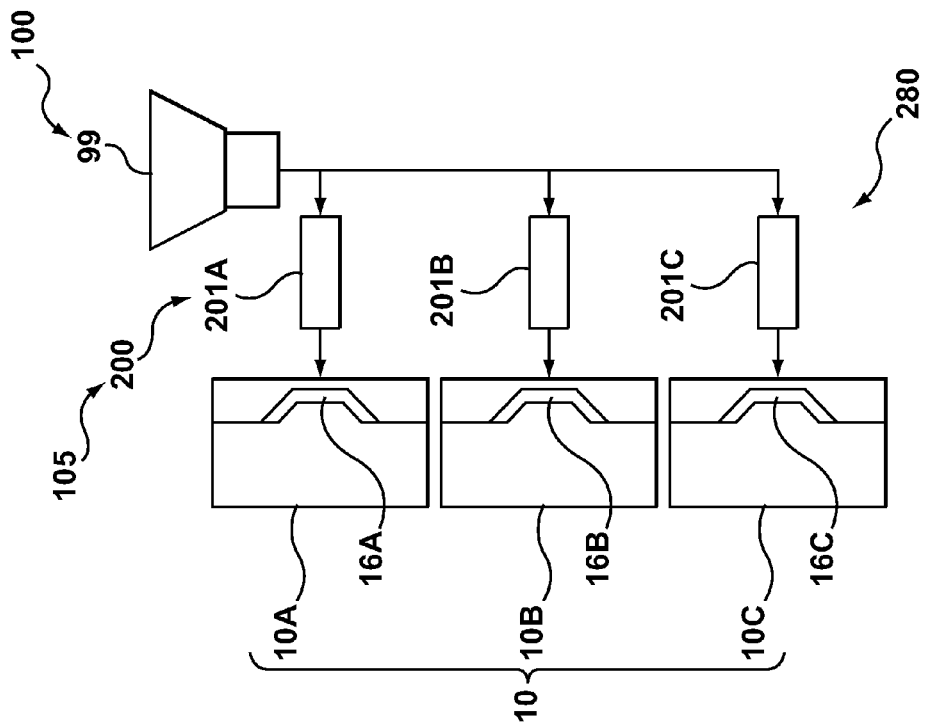

MOLD ASSEMBLY WITH INTEGRATED MELTING DEVICE

TECHNICAL FIELD

An aspect of the present invention generally relates to molding systems and more specifically to a mold assembly having at least one plasticating device contained therein.

BACKGROUND

The first man-made plastic was invented in Britain in 1851 by Alexander Parkes. Mr. Parkes publicly demonstrated his invention at the 1862 International Exhibition in London, calling his invention Parkesine. Parkesine is derived from cellulose and can be heated and molded. The parkesine retained its shape after it was cooled. It was, however, expensive to produce, prone to cracking, and highly flammable. In 1868, American inventor John Wesley Hyatt developed a plastic material he named Celluloid, which was an improvement of Parkes' invention. Hyatt patented the first injection molding machine in 1872. It worked like a large hypodermic needle, using a plunger to inject plastic through a heated cylinder into a mold. The industry expanded rapidly in the 1940s because World War II created a huge demand for inexpensive, mass-produced products. In 1946, American inventor James Watson Hendry built the first screw injection machine. This machine also allowed material to be mixed before injection, so that colored or recycled plastic could be added to virgin material and mixed thoroughly before being injected. In the 1970s, Hendry went on to develop the first gas-assisted injection molding process.

Injection molding machines consist of a material hopper, an injection ram or screw-type plunger, and a heating unit. These machines also have presses that hold the molds in which the components are shaped. Presses are rated by tonnage, which expresses the amount of clamping force that the machine can exert. This force keeps the mold closed during the injection process. Tonnage can vary from less than five tons to 6,000 tons, with the higher figures used in comparatively few manufacturing operations. The total clamp force needed is determined by the projected area of the part being molded. This projected area is multiplied by a clamp force of from two to eight tons for each square inch of the projected areas. As a rule of thumb, four or five tons per square inch can be used for most products. If the plastic material is very stiff, it will require more injection pressure to fill the mold, thus more clamp tonnage to hold the mold closed. The required force can also be determined by the material used and the size of the part, larger parts require higher clamping force. With injection molding, granular plastic is fed by gravity from a hopper into a heated barrel. As the granules are slowly moved forward by a screw-type plunger, the plastic starts to melt and is forced into a heated chamber, where it is completely melted. As the plunger advances, the melted plastic is forced through a nozzle that rests against the mold, allowing it to enter the mold cavity through a gate and runner system. The mold remains cold so the plastic solidifies almost as soon as the mold is filled.

Mold assembly or die are terms used to describe the tooling used to produce plastic parts in molding. The mold assembly is used in mass production where thousands of parts are produced. Molds are typically constructed from hardened steel, etc. Mold assemblies are used in molding systems, along with mold assemblies, for the manufacture of plastic articles. Usually, hot-runners systems and mold assemblies are treated as tools that may be sold and supplied separately from injection molding machines and presses.

United States Patent Publication Number 2009/0274790 (Inventor: JENKO, et al.; Filed: 17 Jul. 2009) discloses a hot runner system including a shooting pot system for transferring melt from a single shooting pot to multiple nozzles. Melt is fed from a source of melt into the cavity through the multiple nozzles, and a valve isolates melt in the cavity from melt in the source. A plunger within the cavity is driven forward to inject melt in the cavity into a mold cavity at high pressure without significantly increasing the pressure of melt in the source. The plunger optionally functions as both the plunger and the valve by opening and closing communication between the cavity and the manifold as it is rotated.

SUMMARY

It is understood that the scope of the present invention is limited to the scope provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood that "comprising" means "including but not limited to the following".

According to an aspect, there is provided a molding system (100) having a mold frame assembly (203) configured for supporting a molding assembly (200), and at least one plasticating device (201) located within the mold assembly (200).

According to another aspect, there is provided a platen-supported system (105) for use with a molding-system platen structure (107), the platen-supported system (105) comprising: a frame assembly (103) being connectable with the molding-system platen structure (107); and at least one plasticating device (201) supported by the frame assembly (103).

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which:

FIG. 2A is a schematic of a first embodiment of the molding system (100) having shooting pots (280);

FIG. 2B is a schematic of a second embodiment of the molding system (100) having shooting pots (280);

Figure 3:
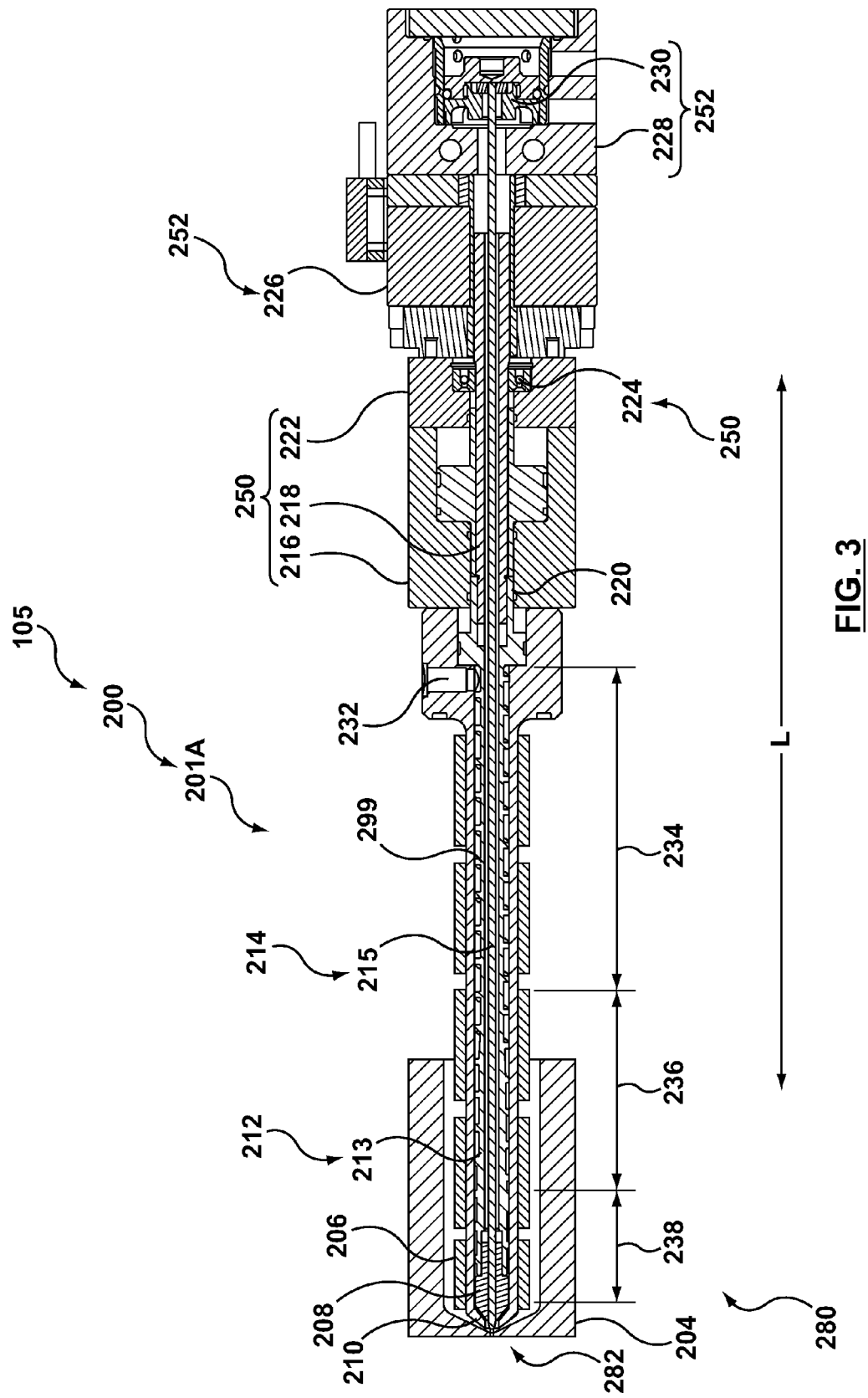
FIG. 3 is a cross-sectional view of one embodiment of the mold assembly (200) having a shooting pot (280)
Figure 4A:
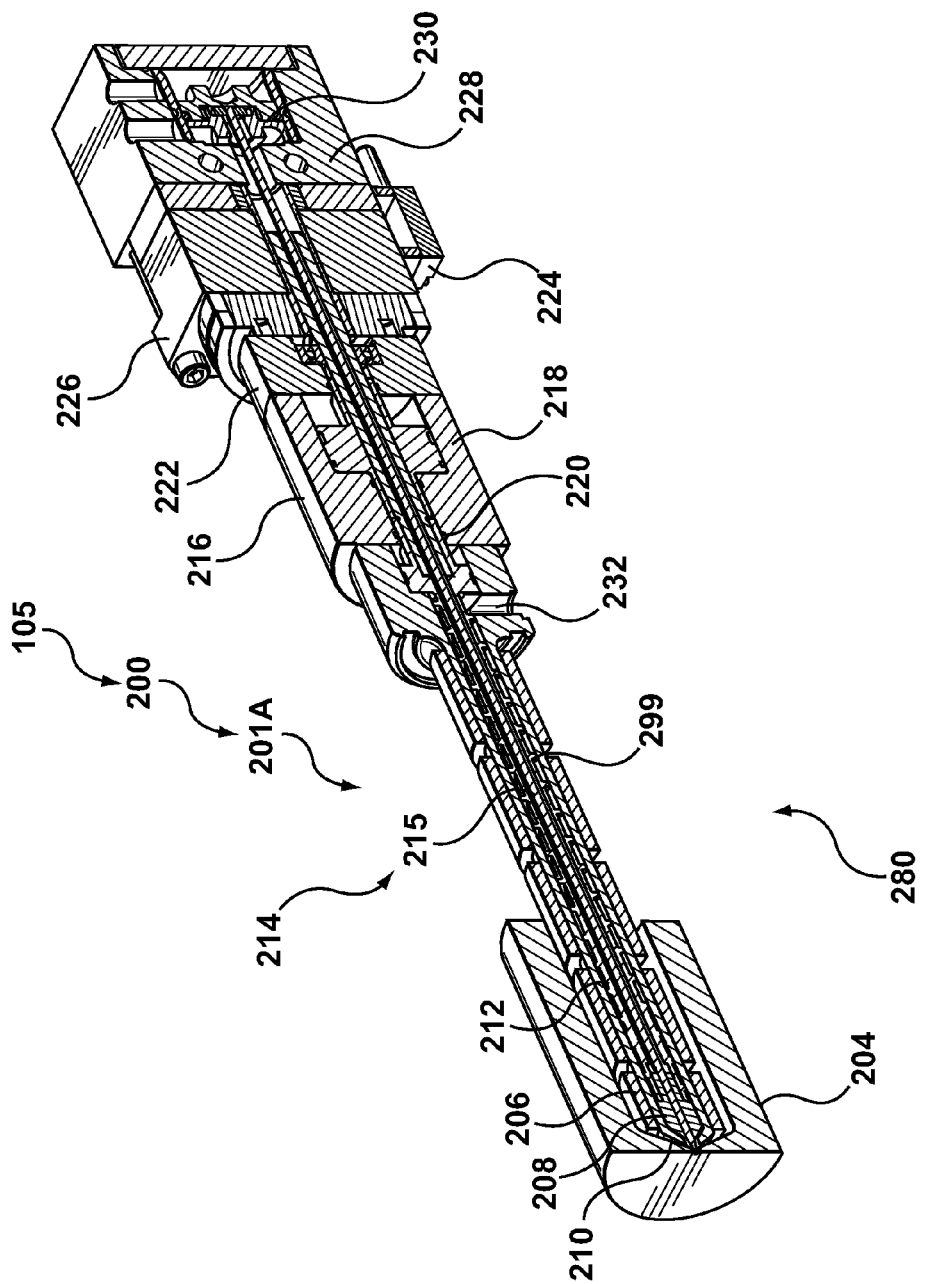
FIG. 4A is a perspective view of the mold assembly (200) having a shooting pot (280) according to FIG. 3.
Figure 4B:
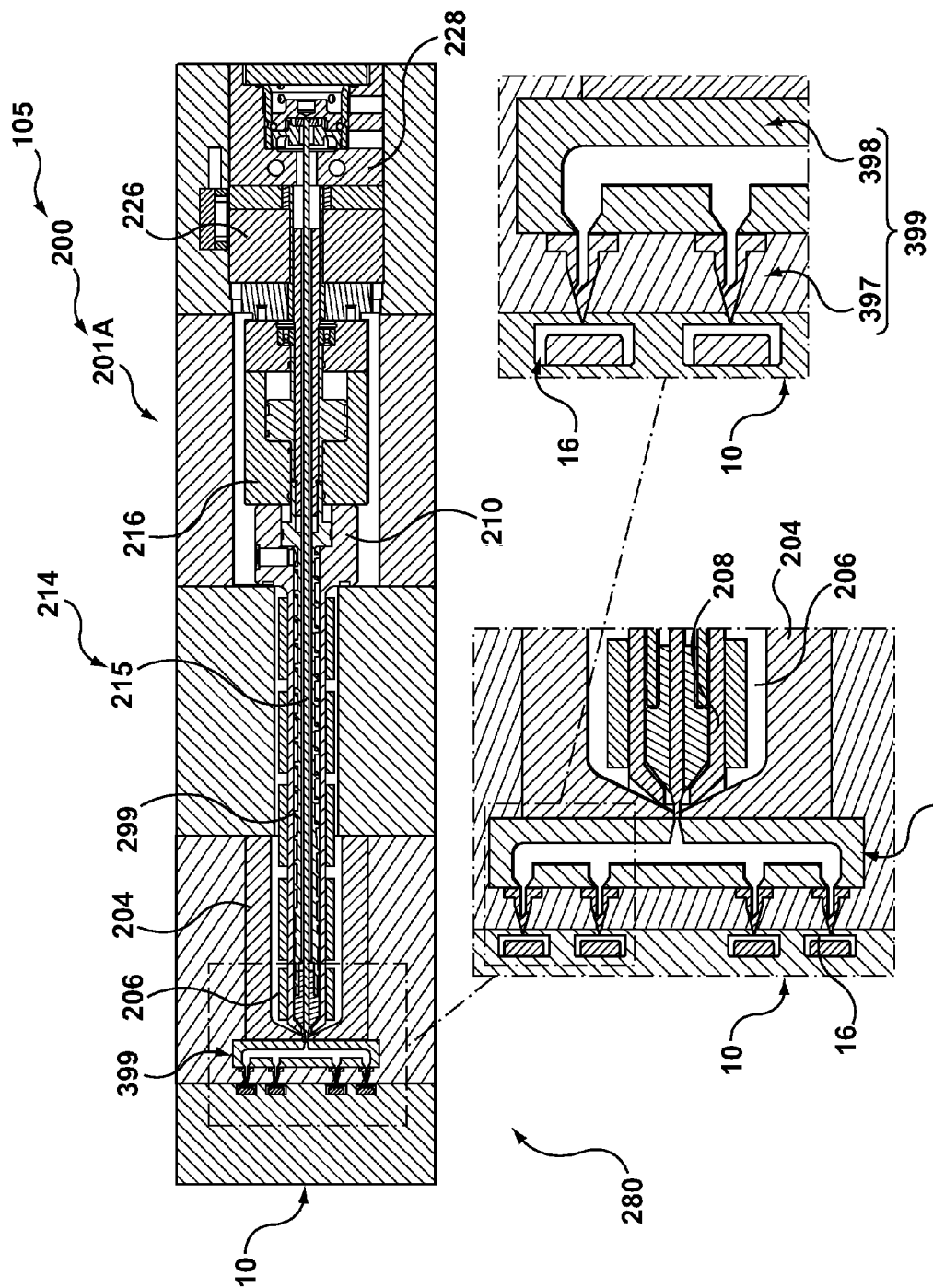
Figure 5:
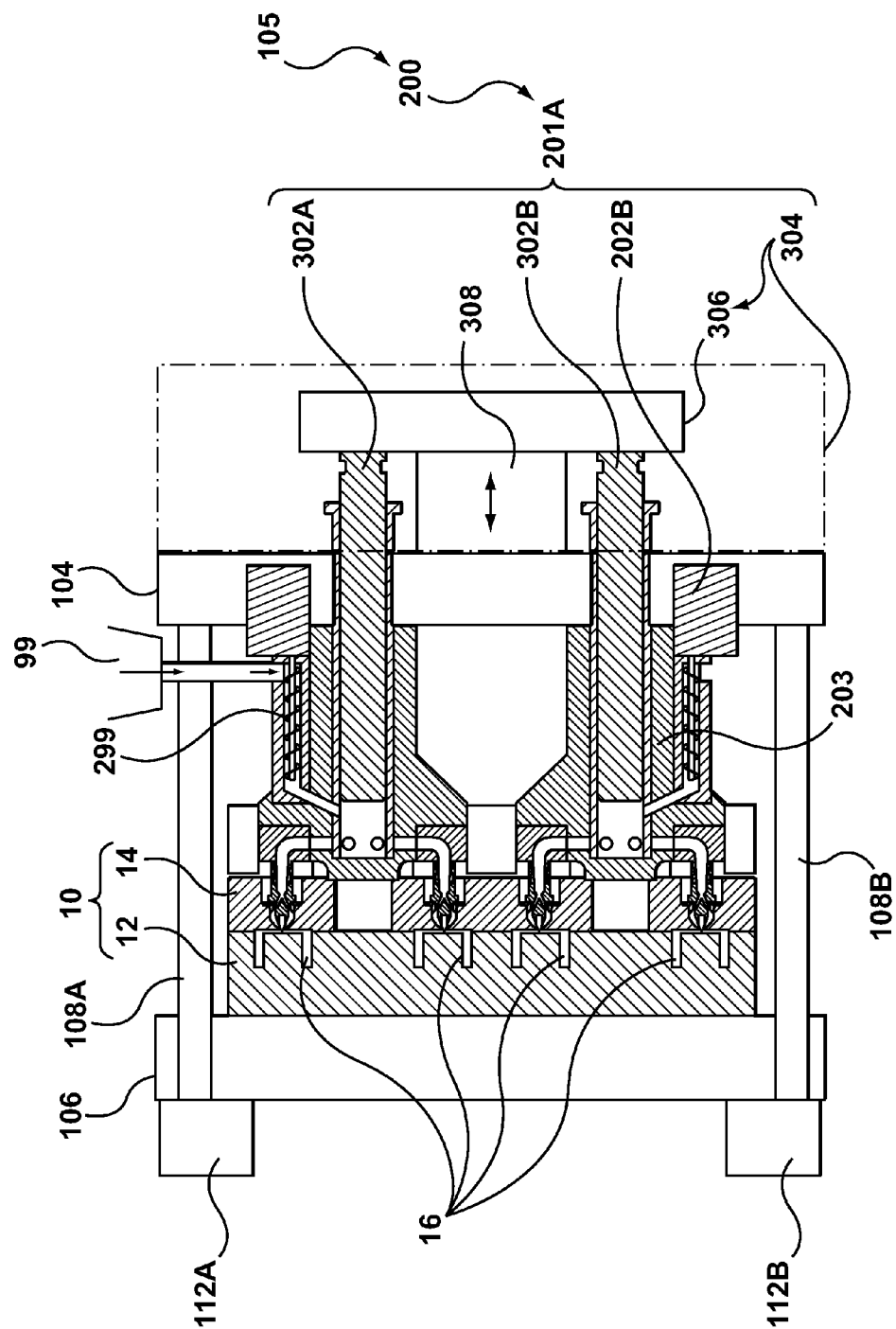
Figure 6:
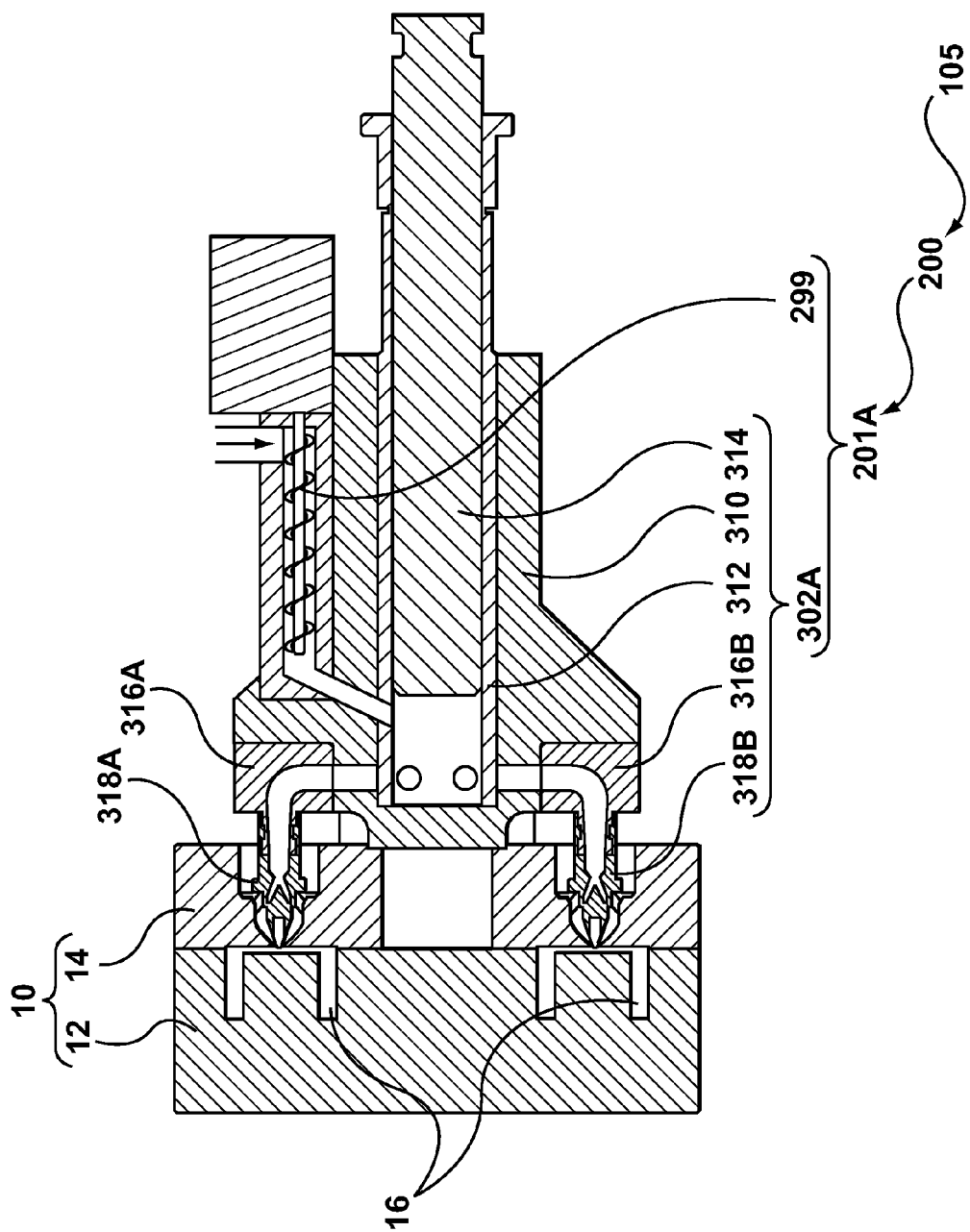
Figure 7:
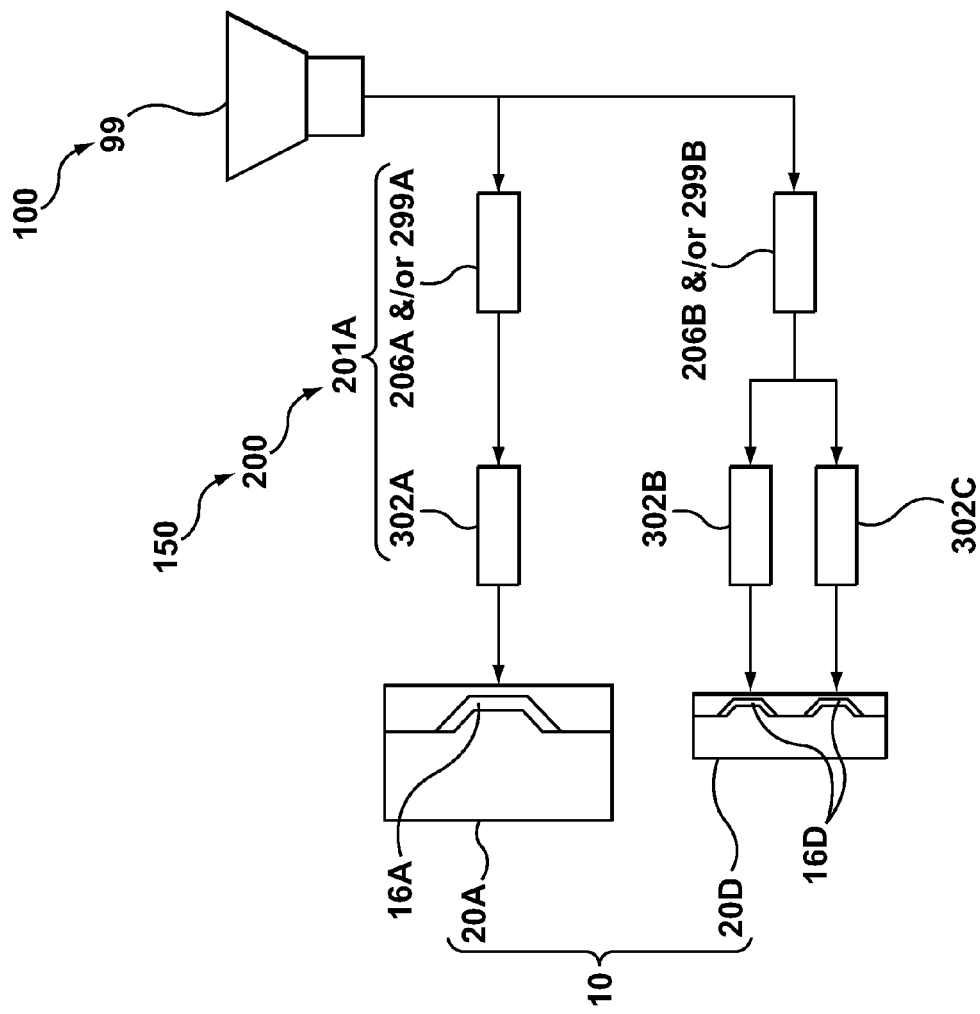
Figure 8A:
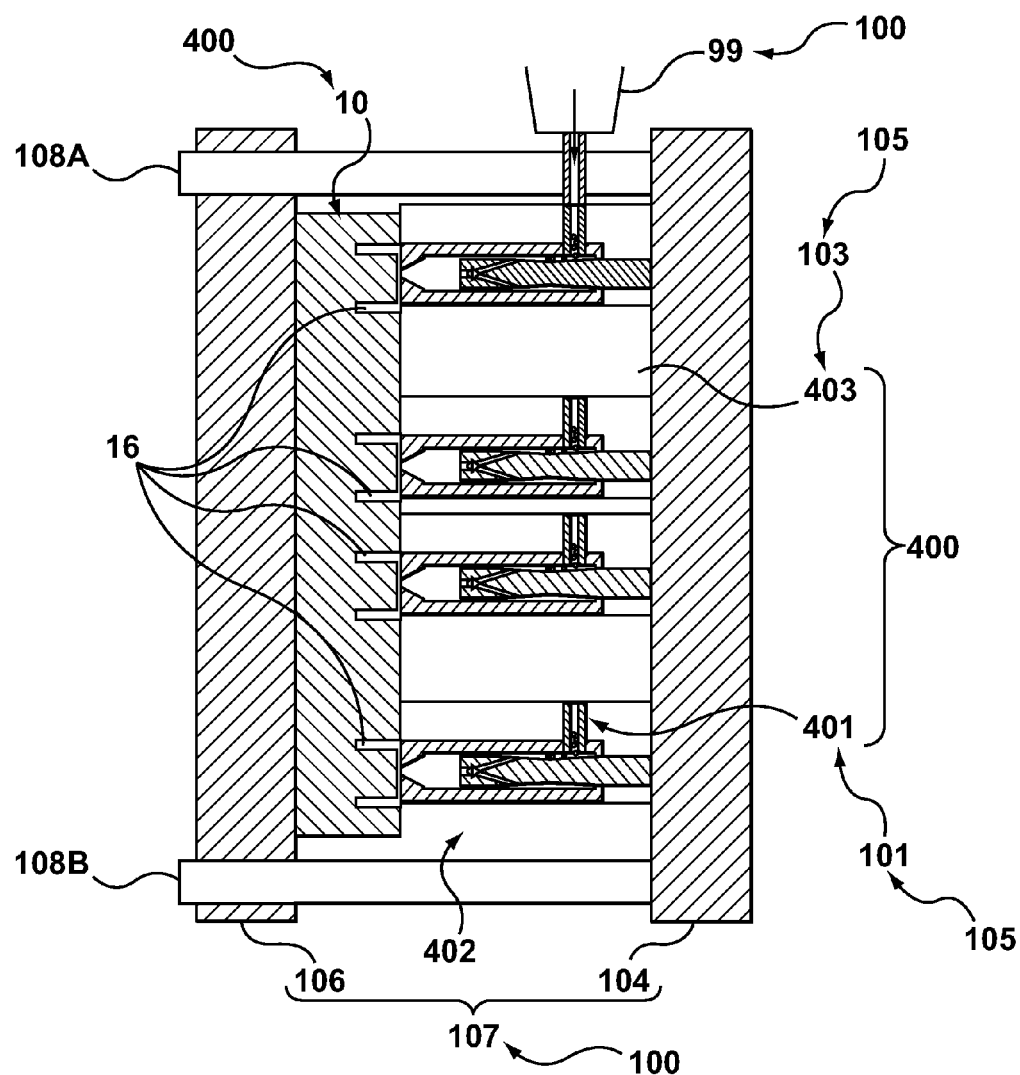
Figure 8B:
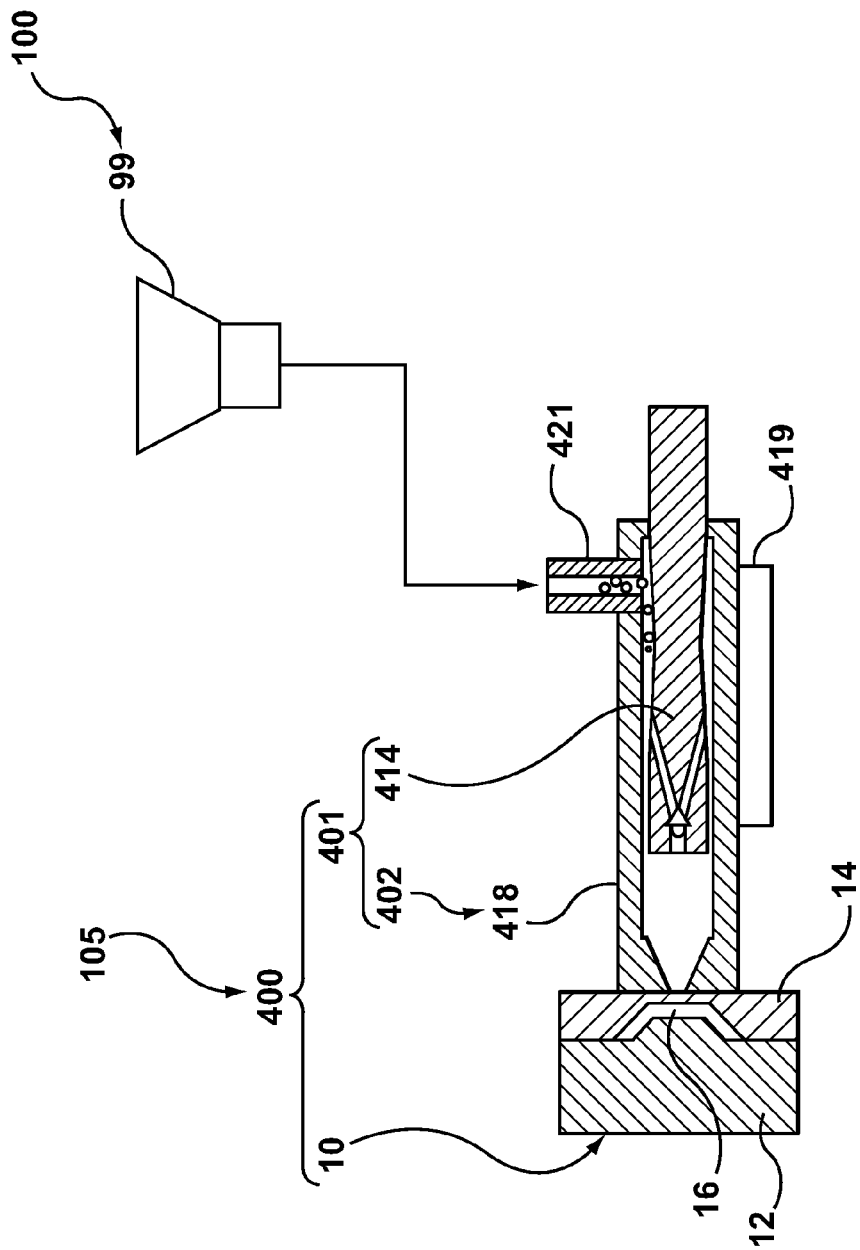
Figure 9:
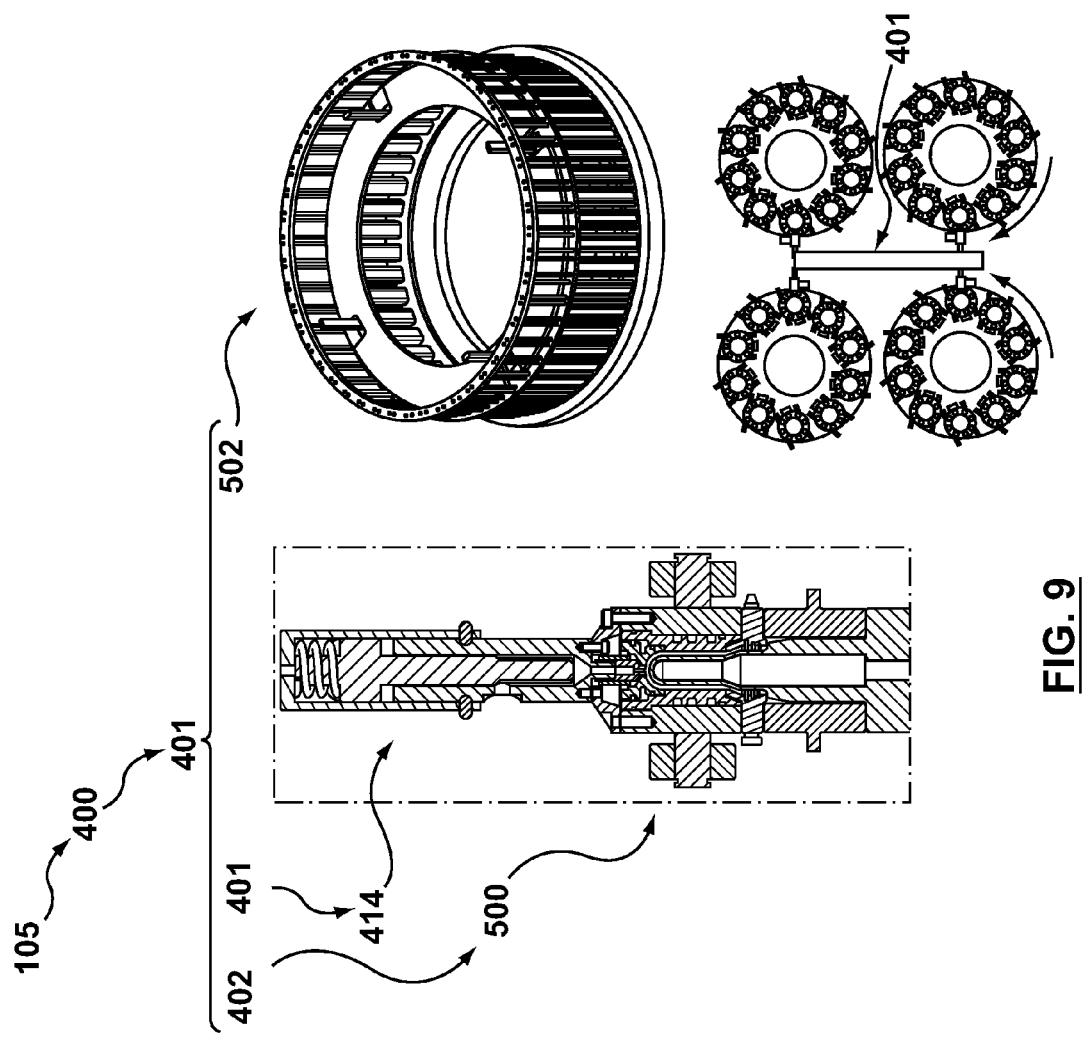

FIG. 4B a cross-sectional view of the mold assembly (200) having a shooting pot (280) in FIG. 3 in fluid communication with cavities (16);

FIG. 5 is a cross-sectional view of a second embodiment of the platen-supported system (105) for use with a molding system (100) having shooting pot assemblies (302A, 302B);

FIG. 6 is an isolated cross-sectional view of one of the shooting pot assemblies (302A) of FIG. 5;

FIG. 7 is a schematic of a third embodiment of the molding system (100) having shooting pots (302A, 302B, 302C);

FIG. 8A is a cross-sectional view of a third embodiment of the platen-supported system (105) for use with a molding system (100) having shooting pot assemblies (402);

FIG. 8B is an isolated cross-sectional view of one of the shooting pot assemblies (402) of FIG. 8A; and FIG. 9 are cross-sectional and perspective views of a third embodiment of the platen-supported system (105) having continuous-cycle shooting pot assemblies (500).

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

Figure 1:
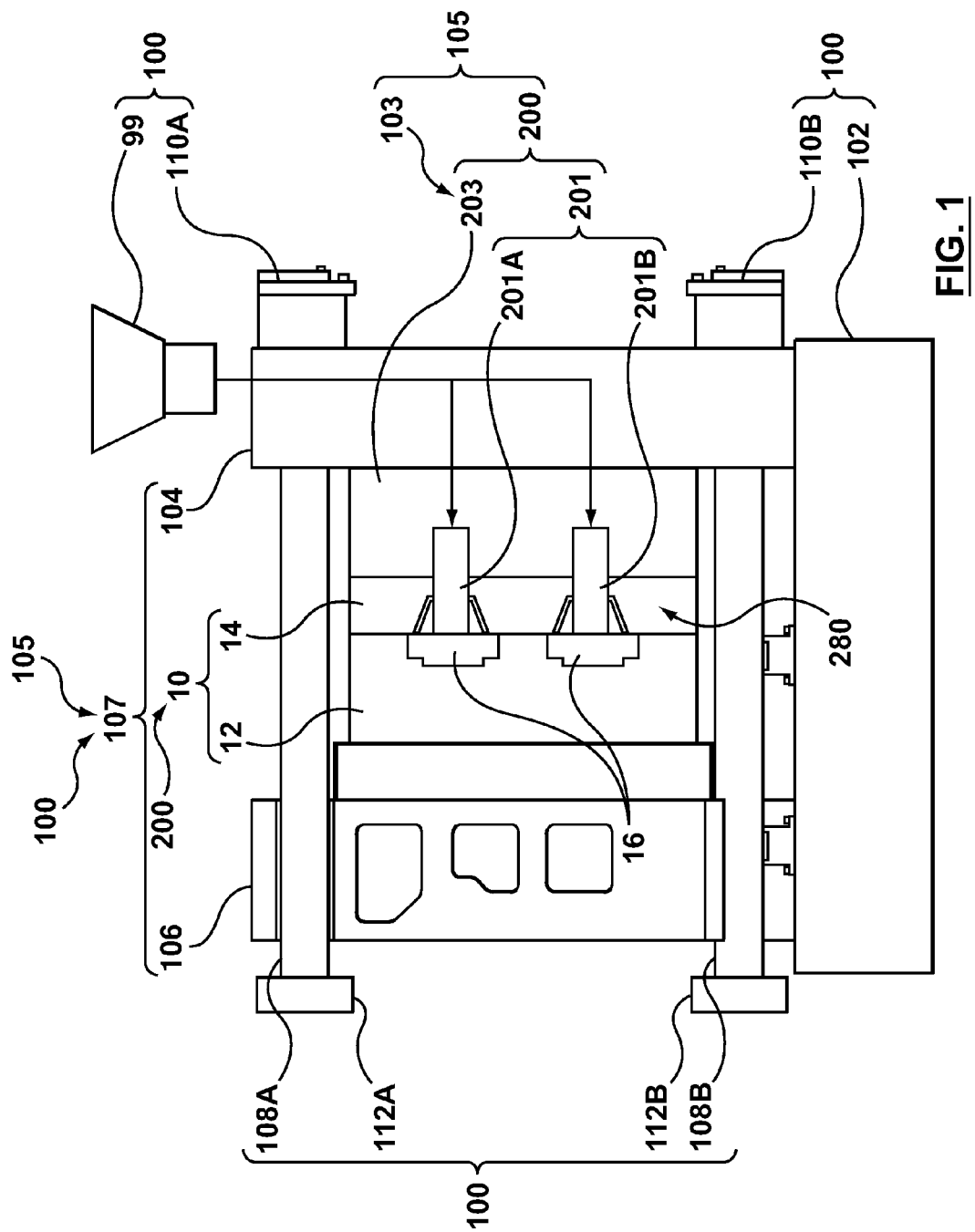
FIG. 1 is a cross-sectional view of a platen-supported system (105) for use with a molding system (100) having shooting pots (280)

FIG. 1 is a cross-sectional view of a platen-supported system (105) for use with a molding system (100) having shooting pots (280). In this embodiment, the platen-supported system (105) may be used without an injection molding machine (not shown) because the melting and injecting of resin occurs with the platen-supported system (105).

The platen-supported system (105) is for use with a molding-system platen structure (107). The platen-supported system (105) may include but is not limited to: (i) a frame assembly (103), and (ii) at least one plasticating device (201). The frame assembly (103) may be used with the molding-system platen structure (107), and (ii) the at least one plasticating device (201) may be supported by the frame assembly (103). Specifically, the molding-system platen structure (107) includes but is not limited to: (i) a stationary platen (104), and (ii) a movable platen (106) that is movable relative to the stationary platen (104). The platen-supported system (105) may be an apparatus, an assembly, a sub-assembly, etc. that is structurally supported by the molding-system platen structure (107), and may be positioned between the stationary platen (104) and the movable platen (106) of the molding-system platen structure (107).

A non-limiting example of the platen-supported system (105) is but not limited to the following arrangement of combined components or articles: (i) the frame assembly (103) including but not limited to a mold frame (203) of a mold assembly (200), and (ii) the at least one plasticating device (201) labeled ((201A), (201B), etc.) when used to identify multiple plasticating devices (201). The at least one plasticating device (201) may be supported by the mold frame (203). Other examples of the platen-supported system (105) will be described below. The mold assembly (200) may be supported between the platens (104, 106) of the molding system (100).

Unlike with the traditional injection molding systems that have an injection molding machine that receives, melts and conveys resin, the at least one plasticating devices (201) is contained or located within the mold assembly (200) and the at least one plasticating devices (201) receives, melts, and conveys the melted resin to shooting pots (280). In an alternative embodiment, the at least one plasticating devices (201) is located within the platen-supported system (105) and the at least one plasticating devices (201) receives, melts, and conveys the melted resin to shooting pots (280). The melt can be metered by the shooting pots (280) and the action of the plunger travelling through each of the shooting pots (280) pressurizes the melt and injects it into cavities (16). One portion of the mold assembly (200) is configured to heat the melted moldable material while another part of the mold assembly (200) is being cooled in order to solidify the product quickly. The mold assembly (200) may be externally heated and/or internally heated. A controller is used to control the temperature in the mold assembly (200).

The mold assembly (200) may also include a mold frame (203) configured in the molding system (100). The at least one plasticating device (201) of the mold assembly (200) may be supported by the mold frame (203). The at least one plasticating device (201) is defined as an apparatus that is configured to cause solid matter (such as, for example, resin pellets, resin powder, resin gobs, or any other resin form, or any type of metallic alloy, or any type of moldable material in general), to melt (such as, for example, a resin melt, or heated molten moldable material in general).

In one example, the at least one plasticating device (201) may have a heater assembly (206) and/or a drive mechanism (299), such as an extruder or a plasticating screw, to melt the solid matter. The at least one plasticating device (201) melts solid moldable material into a molten moldable material which is then conveyed into cavities (16) of mold plates (10).

The mold plates (10) may include but are not limited to: (i) a first mold plate (12), which is supported by the movable platen (106), and (ii) a second mold plate (14), which is supported by the stationary platen (104). The mold plates (10) define the cavities (16). The cavities (16) define the part and thus are shaped like the parts to be produced.

The mold assembly (200) is configured to heat the molten moldable material while the mold plates (10) of the mold assembly (200) are cooled in order to solidify the product quickly. The heated portions of the mold assembly (200) may be externally heated and/or internally heated.

The molding system (100) may include but is not limited to: (i) a frame (102), (ii) the stationary platen (104), (iii) the movable platen (106) that is movable relative to the stationary platen (104), (iv) tie bars (108A, 108B) that extend between the stationary platen (104) and the movable platen (106), (v) clamp units (110A, 110B) operatively attached to one end of the tie bars (108A, 108B), (vi) locks (112A, 112B) attached to the other ends of the tie bars (108A, 108B), and (vii) a resin-delivery assembly (99). The resin-delivery assembly (99) includes, for example, a hopper assembly, etc. The resin-delivery assembly (99) may be configured to deliver the solid moldable material to each of the at least one plasticating devices (201A, 201B). The mold plates (10) are supported by the molding system (100).

It will be appreciated that for the resin-delivery assembly (99), there are many arrangements or structures that may be used to feed, deliver, or convey unmelted resin to the at least one plasticating device (201). By way of example, the resin-delivery assembly (99) may include delivery pipes, tubing, or conduits, either straight and/or bent, either open and/or closed, or either flexible and/or rigid. The resin-delivery assembly (99) may include a conveyor assembly, which may use rolling feed, belt feed, and/or gear feed. The conveying medium used by the resin-delivery assembly (99) may be: (i) air (pressurized and/or heated), (ii) gas (helium or other may be used for preheating the resin as the resin is conveyed), and/or (iii) a combination of air and/or gravity, etc.

FIG. 2A is a schematic of an embodiment of the molding system (100) having shooting pots (280). The mold assembly (200) includes a plurality of the at least one plasticating devices (201A, 201B, 201C). The mold plates (10) may include a plurality of the cavities (16A, 16B, 160). Each of the at least one plasticating devices (201A, 201B, 201C) is in fluid communication with a corresponding cavity of the plurality of cavities (16A, 16B, 16C). That is, each of the at least one plasticating devices (201) is configured to inject moldable material into a single mold cavity.

FIG. 2B is a schematic of another embodiment of the molding system (100) having shooting pots (280). The mold plates (10) include sets of cavities (16D', 16D"; 16E', 16E"; 16F', 16F"; 16G', 16G"). The sets of cavities may contain two or more cavities. The mold assembly (200) includes a plurality of the at least one plasticating devices (201A, 201B, 201C, 201D). Each of the at least one plasticating devices (201A, 201B, 201C) is in fluid communication with a plurality of the cavities (16D', 16D"; 16E', 16E"; 16F', 16F"; or 16G', 16G"). Each of the at least one plasticating devices (201A, 201B, 201C) is in fluid communication with a set or group of the cavities (16D', 16D"; 16E', 16E"; 16F', 16F"; or 16G', 16G"). Each of the at least one plasticating devices (201) is configured to inject the moldable material into multiple mold cavities. It should be noted that the exact number in excess of one cavity (16) being fed by one of the at least one plasticating devices (201) is not meant to be limiting.

FIG. 3 depicts a cross-sectional view of the mold assembly (200) having a shooting pot (280). According to one embodiment, the shooting pot (280) has at least one plasticating device (201). The at least one plasticating device (201) may have a heater assembly (206) and/or drive mechanism (299) for melting the solid material. The drive mechanism (299) may be a screw device. The heating assembly (206) may be a band heater for example operatively connected to a barrel assembly (210). The at least one plasticating device (201) may include but is not limited to: (i) a barrel assembly (210), (ii) a melt-conversion assembly (212), and (iii) a valve (214). The barrel assembly (210) may have an exit port (282), which is in fluid communication with an entrance of the mold plates (10) that leads to the cavities (16). The melt-conversion assembly (212) may be received in the barrel assembly (210). In one embodiment, the melt-conversion assembly (212) may include a screw assembly (213). The valve (214) may be configured to selectively open and close the exit port (282) of the barrel assembly (210). More specifically, the screw assembly (213) of the melt-conversion assembly (212) may be received in the barrel assembly (210). The valve (214) may include a valve-stem assembly (215) that is slide engaged along a longitudinal axis (L) of the screw assembly (213). The barrel assembly (210) may include the heater assembly (206) operatively connected with the barrel assembly (210). A screw actuator (250) may be operatively connected with the screw assembly (213). A stem actuator (252) may be operatively connected with the valve-stem assembly (215). A mold gate insert (204), which is also called a gate insert, may surround the tip of the barrel assembly (210). The heater assembly (206) may include: a band heater and/or an induction heater (known and not depicted), etc. The screw assembly (213) may include a screw tip (208). The barrel assembly (210) may also be called a screw housing. The barrel assembly (210) has a feed port (232). Resin may be input into the feed port (232) to the screw assembly (213) of the melt-conversion assembly (212).

The screw assembly (213) of the melt-conversion assembly (212) may be received in the barrel assembly (210). The valve (214) may also include a valve-stem assembly (215) received in the screw assembly (213). An injection piston (218) may be connected to the screw assembly (213). A housing (216) may be used to house the injection piston (218). The housing (216) may also be called a hydraulic (or pneumatic) injection-cylinder housing.

It will be appreciated that the screw actuator (250) and the stem actuator (252) depicted in FIG. 3 may be replaced with equivalent electrical actuators, such as electric motors, hollow-shaft electric motors, etc. Actuation of the melt-conversion assembly (212) and/or of the screw assembly (213) may be accomplished with hydraulic actuation mechanisms, electrical actuation mechanisms, or a combination of hydraulic actuation mechanisms and electrical actuation mechanisms to suit the requirements of the users of the molding system (100) or of the mold assembly (200). By way of example, the screw actuator (250) and the stem actuator (252) may include, for example, a shape-memory alloy actuator. It is understood that any type of suitable actuator may be used.

A sliding connection (220) may operatively connect the injection piston (218) with the screw assembly (213). An adaptor (222), which may also called a "hydraulic (or pneumatic) injection-cylinder cover and hollow shaft motor adapter", may be used to connect the housing (216) to a motor (226), which may also be called a hollow shaft motor. A bearing (224) is used to permit rotation of the injection piston (218). A plate (228), which may also be called a "pneumatic actuator plate", may be used to deliver pressurized air to an actuator (230), which may also called a "pneumatic actuator". The at least one plasticating device (201) may be of an open nozzle type (not depicted) or the shutoff type as depicted in FIG. 3. It is understood that the scope of some of the claims, unless specifically mentioned in the claims, is not limited to using pneumatic, electrical or hydraulic actuators. The stem actuator (252) is not limited to any type of actuator as well, such as pneumatic, hydraulic, electrical, smart materials such as shape-memory alloy actuator (SMAS) or piezoceramic, etc. It will be appreciated that for the arrangement depicted in FIG. 3, translation and rotation motion are used to heat and melt the resin.

The embodiment shown in FIG. 3 eliminates the need for an injection molding unit and hot runner system to melt, convey, and inject resin into the cavities (16) of the mold plates (10). Instead, the shooting pot (280) has the screw assembly (213) and the heater assembly (206) for melting, conveying and injecting resin into the cavities (16) of the mold plates (10).

In operation, resin is fed into the feed port (232) to the screw assembly (213) of the melt-conversion assembly (212). The screw assembly (213) of the melt-conversion assembly (212) and the heater assembly (206) melt the resin. Thereafter, the melt is fed into the cavities (16) of the mold plates (10).

FIG. 4A is a perspective view of the mold assembly (200) having the shooting pot (280) according to FIG. 3. FIG. 4B a cross-sectional view of the mold assembly (200) having a shooting pot (280) in FIG. 3 in fluid communication with cavities (16). The at least one plasticating device (201) may be configured to be in fluid communication with the cavities (16) defined in the mold plates (12). The at least one plasticating device (201) may be configured to be in fluid communication with a mold-runner apparatus (399). In one embodiment, the mold-runner apparatus (399) may include but is not limited to: (i) a manifold (398), and (ii) at least one nozzle (397) in fluid communication with the manifold (398). The at least one nozzle (397) may also be in fluid communication with the cavities (16) of the mold plates (10). The manifold (398) receives melt from the at least one plasticating device (201) and then distributes the melt to the at least one nozzle (397), and the at least one nozzle (397) distributes the melt to the cavities (16) of the mold plates (10). In another embodiment, the shooting pot (280) does not have the manifold (398) or the at least one nozzles (397).

In operation, the at least one plasticating device (201) in fluid communication with the shooting pot (280) melts and passes the resin to the cavities (16) of the mold plates (10).

FIG. 5 is a cross-sectional view of a second embodiment of the platen-supported system (105) for use with a molding system (100) having shooting pot assemblies (302A, 302B). It is important to note that the number of shooting pot assemblies (302A, 302B) is not meant to be limiting. Like with the embodiment shown in FIG. 3, in FIG. 5 the at least one plasticating device (201) is located within the platen-supported system (105); however, unlike the embodiment shown in FIG. 3, the embodiment of FIG. 5 does not utilize an in-line at least one plasticating device (201). In addition, the at least one plasticating device (201) is located within molding apparatus (200).

In this embodiment, the at least one plasticating device (201) is separate from the shooting-pot assembly (302A, 302B) but is configured to be in fluid communication with the shooting-pot assembly (302A, 302B). The shooting-pot assembly (302A, 302B) and the at least one plasticating device (201) are located within molding apparatus (200). The shooting-pot assembly (302A, 302B) may be supported by the mold frame (203).

According to another embodiment, by way of example, the at least one plasticating device (201) may be supported by the mold frame (203). The at least one plasticating device (201) of the shooting-pot assembly (302A, 302B) is in fluid communication with the cavities (16) of the mold plates (10). According to a specific example, the shooting-pot assemblies (302A, 302B) may include a shooting-pot actuation assembly (304) operatively connected thereto. The shooting-pot actuation assembly (304) may include but is not limited to: (i) a plate assembly (306), and (ii) a plate actuator (308). The plate actuator (308) may be operatively connected to the stationary platen (104) and the plate assembly (306), which is movable in response to the plate actuator (308) being actuated.

FIG. 6 is an isolated cross-sectional view of one of the shooting pot assemblies (302A) of FIG. 5. The shooting-pot assembly (302A) may include: (i) a housing (310), (ii) a sleeve (312) received in the housing (310), (iii) a plunger (314) received in the sleeve (312), (iv) nozzles (318A, 318B) that may be in fluid communication with the mold plates (10), and (v) drop blocks (316A, 316B) operatively connecting the housing (310) to the nozzles (318A, 318B). The at least one plasticating device (201) is separate from the shooting-pot assembly (302A, 302B) but is configured to be in fluid communication with the shooting-pot assembly (302A, 302B).

FIG. 7 is a schematic of a third embodiment of the molding system (100) having shooting pots (302A, 302B, 302C). It will be appreciated that one of at least one plasticating devices (201A) of one of the shooting-pot assemblies (302A) may be in fluid communication with one of the mold cavity (16A). It will be appreciated that one of the at least one plasticating device (201A) may be in fluid communication (alternatively, simultaneously, or predeterminedly) with multiple shooting-pot assemblies (302B, 302C). These are just some examples of the many permutations and combinations thereof.

FIG. 8A is a cross-sectional view of a third embodiment of the platen-supported system (105) for use with a molding system (100) having shooting pot assemblies (402). FIG. 8B is an isolated cross-sectional view of one of the shooting pot assemblies (402) of FIG. 8A. In both FIGS. 8A and 8B, the at least one plasticating devices (401) are located within the platen-supported system (105) or a mold assembly (400).

FIGS. 8A and 8B are non-limiting examples of an arrangement of the platen-supported system (105), in which: (i) the frame assembly (103) may include but is not limited to a mold frame (403) of the mold assembly (400), and (ii) the at least one plasticating device (401) of the mold assembly (400). The at least one plasticating device (401) of the shooting pot assembly (402) is supported by the mold frame (403). The platen-supported system (105) may be configured to perform melting and injecting functions within the mold assembly (400).

Referring now to FIG. 8B, the shooting pot assembly (402) may be configured to be in fluid communication with a nozzle assembly (418), and the nozzle assembly (418) may be configured to interface with the second mold plate (14) of the mold plates (10), which define the mold cavities (16) so as to deliver melted resin from the nozzle assembly (418) to the cavities (16) of the mold plates (10). The at least one plasticating device (401) may be adapted or configured to include but is not limited to a plunger assembly (414) that may be slidably or rotatably received in the nozzle assembly (418). The nozzle assembly (418) may also be configured to receive from the resin-delivery assembly (99), unmelted resin. The plunger assembly (414) may be configured to melt the resin within the nozzle assembly (418). It will be appreciated that there are many arrangements that may be used to melt the resin in the nozzle assembly (418), such as but not limited to: (i) placing and using screw flights (not depicted) on the outer circumference of the plunger assembly (414), and/or (ii) placing and using an induction heater (419) connected with the nozzle assembly (418), etc. The nozzle assembly (418) may be configured to melt the resin and to inject the melted resin into the cavities (16) of the mold plates (10). It will be appreciated that the molding system (100) provides the clamp force to the mold plates (10) during injection of the melted resin into the cavities (16) of the mold plates (10). It will be appreciated that pellets or gobs may be fed to the nozzle assembly (418), and this arrangement may simplify resin transfer. A feed throat (421) connects the resin-delivery assembly (99) to the nozzle assembly (418), and the zone in the feed throat (421) may be used to melt the resin before (or while) the melted resin is injected. In one embodiment, a semi-molten gob of resin may be used or inserted into the nozzle assembly (418) when the plunger assembly (414) is fully retracted from the nozzle assembly (418). The plunger assembly (414) may use translation motion to heat the resin combined or not with rotation. It will be appreciated that friction for melting the resin may be used, for example friction may be generated as a result of plunger actuation, and/or friction may be used to partially melt the resin and the heater may be used as well. Those skilled in the art could arrange other assemblies for heating the resin in the nozzle assembly (418), such as ultrasonics, electron beam, laser, resistive heating, inductive heating, translation causing shear, screw (rotational causing shear), and/or any combination thereof. Any heating means, such as mechanical and/or electrical or combination thereof, etc. may be used. Rotational motion, such as by way of a screw flight on the plunger assembly (414), may be used with or without the heater. The following are possible shapes and sizes of the unmelted resin: pellets, powder, flakes, sheet of resin (that is, extruded film), pre-heated gob of resin (extruded gob), etc. Shear effects, such as a pin translating inside a housing, a housing translating over a pin, rotational shear, a pin rotating inside a housing, a housing rotating around a pin, or any combination of the arrangements listed above may also be used. It will be appreciated that an array of screws may be used for improved efficiency of melting resin within a smaller device. The array of screws may be housed in a single combined stage or in multiple overlapping or sequential stages.

It will be appreciated that the at least one plasticating device (401) may further include but is not limited to the assemblies described above, such as: (i) the barrel assembly (210) having an exit port (282), (ii) the melt-conversion assembly (212) received in the barrel assembly (210), and (iii)

the valve (214) configured to selectively open and close the exit port (282) of the barrel assembly (210). According to another example, the at least one plasticating device (401) may further include but is not limited to the shooting-pot assembly (302A, 302B) configured to be coupled to the mold plates (10). According to another example, the at least one plasticating device (401) may be supported by the mold frame (403), and may be in fluid communication with the shooting-pot assembly (302A, 302B).

FIG. 9 are cross-sectional and perspective views of a third embodiment of the platen-supported system (105) having continuous-cycle shooting pot assemblies (500). The mold assembly (400) may further include but is not limited to: a modular carousel (502) that is fed by the at least one plasticating device (401). This arrangement permits a scalable solution and/or a continuous process, and/or mass production of small components. When the plunger assembly (414) reciprocates, the melted resin is forced between the narrow channels and friction causes the resin to melt (by shearing). The melted resin may be fed in front of the plunger assembly (414) by internal channels controlled by a check valve (not depicted), etc.

GENERAL DISCUSSION

The at least one plasticating devices (201, 401) located within the platen-supported system (105) of the mold assembly (200) melt the resin proximate the cavities (16) of the mold plates (10). The plungers of the shooting pots (280, 302, 500) meters and injects the melted resin into the cavities (16). In some cases, the at least one plasticating devices (201, 401) may be part of the plunger assembly and perform the dual function of melting and injecting into the cavities (16). This arrangement may be set up for high cavitation mold assemblies as well, using simple drop devices and a special machine layout for specialized production of specific products like closures, etc. Technical benefits may be: (i) individual thermal drop control potential (that is, elimination of part quality waste due to differences in thermal history between cavities, (ii) thinner part walls based on optimized thermal condition, (iii) shorter cycles by avoiding overheating plastic) and also a huge energy savings in the system since the arrangement only heats a small amount locally when required, (iv) elimination of plate cooling since the hot melted resin is in proximity of the nozzle, instead of having to be conveyed through the supporting structure.

It is noted that the foregoing has outlined the non-limiting embodiments. Thus, although the description is made for particular non-limiting embodiments, the scope of the present invention is suitable and applicable to other arrangements and applications. Modifications to the non-limiting embodiments can be effected without departing from the scope the independent claims. It is understood that the non-limiting embodiments are merely is illustrative.

What is claimed is:

1. A molding system, comprising:
   a stationary platen;
   a movable platen movable relative to the stationary platen;
   a mold frame assembly configured for supporting a mold assembly, the mold assembly having a first mold plate supported by the movable platen and a second mold plate supported by the stationary platen, the mold assembly positionable between the stationary platen and the movable platen; and
   a plurality of plasticating devices located within the mold assembly.

2. The molding system of claim 1, wherein:
   each of the plurality of plasticating devices includes either a heater assembly or drive mechanism.

3. The molding system of claim 1, wherein:
   each of the plurality of plasticating devices includes:
   a respective barrel assembly having an exit port;
   a respective melt-conversion assembly received in the barrel assembly; and
   a respective valve configured to selectively open and close the exit port of the barrel assembly.

4. The molding system of claim 3, wherein:
   the respective melt-conversion assembly includes a screw assembly received in the barrel assembly;
   the respective valve includes a valve-stem assembly slidably engaged along a longitudinal axis of the screw assembly;
   the respective barrel assembly includes a heater assembly operatively connected with the barrel assembly;
   a screw actuator operatively connected with the screw assembly; and
   a stem actuator operatively connected with the valve-stem assembly.

5. The molding system of claim 1, further including a shooting-pot assembly having the plurality of plasticating devices and configured to be operatively coupled to the mold assembly.

6. The molding system of claim 1, further including a shooting-pot assembly having the plurality of plasticating devices, wherein the plurality of plasticating devices are supported by the mold frame assembly.

7. The molding system of claim 1, further including a shooting-pot assembly having the plurality of plasticating devices, wherein the shooting-pot assembly is:
   (i) coupled to the plurality of plasticating devices, and
   (ii) configured to be coupled to the second mold plate so as to deliver the melt to the mold assembly.

8. The molding system of claim 7, wherein:
   the plurality of plasticating devices includes:
   a barrel assembly having an exit port;
   a melt-conversion assembly operatively received in the barrel assembly;
   a valve configured to selectively open and close the exit port of the barrel assembly.

9. The molding system of claim 5, wherein:
   the shooting-pot assembly is configured to include:
   a nozzle assembly configured to interface with the mold assembly; and
   the plurality of plasticating devices is configured to include:
   a plunger assembly slidably received in the nozzle assembly.

10. The molding system of claim 5, wherein:
    the shooting-pot assembly includes:
    continuous-cycle shooting pot assemblies.

11. The molding system of claim 1, further comprising:
    a modular carousel that is fed by the plurality of plasticating devices.

12. The molding system of claim 1, wherein:
    melted resin is fed to a drop site in a rod form and heated and injected into a mold cavity.

* * * * *